US008773676B2

(12) United States Patent
Tsujimoto

(10) Patent No.: US 8,773,676 B2
(45) Date of Patent: Jul. 8, 2014

(54) MULTIFUNCTION PERIPHERAL, MULTIFUNCTION PERIPHERAL CONTROL SYSTEM, AND MULTIFUNCTION PERIPHERAL CONTROL METHOD FOR PREPARING INFORMATION DISPLAY SCREEN INCLUDING CHANGING DEFAULT CONDITIONS

(75) Inventor: Kunihiko Tsujimoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 185 days.

(21) Appl. No.: 13/363,945

(22) Filed: Feb. 1, 2012

(65) Prior Publication Data
US 2012/0229832 A1 Sep. 13, 2012

(30) Foreign Application Priority Data

Mar. 7, 2011 (JP) ................................. 2011-048884
Apr. 8, 2011 (JP) ................................. 2011-086811

(51) Int. Cl.
*G06K 15/02* (2006.01)
(52) U.S. Cl.
USPC ......................................... 358/1.13; 358/1.15
(58) Field of Classification Search
USPC .............................................. 358/1.13, 1.15
See application file for complete search history.

(56) References Cited

U.S. PATENT DOCUMENTS

| 2005/0046887 | A1 | 3/2005 | Shibata et al. |
| 2007/0013673 | A1 | 1/2007 | Minari |
| 2007/0159663 | A1 | 7/2007 | Tsujimoto |
| 2008/0120563 | A1 | 5/2008 | Tang et al. |
| 2009/0128844 | A1 | 5/2009 | Kondo et al. |
| 2009/0195506 | A1 | 8/2009 | Geidl et al. |
| 2009/0310180 | A1 | 12/2009 | Uchida et al. |
| 2011/0157636 | A1* | 6/2011 | Maeda ......................... 358/1.15 |
| 2011/0254773 | A1 | 10/2011 | Minari |

FOREIGN PATENT DOCUMENTS

| JP | 2002-99480 A | 4/2002 |
| JP | 2002-281195 A | 9/2002 |
| JP | 2005-080017 A | 3/2005 |
| JP | 2005-215728 A | 8/2005 |
| JP | 2006-277005 A | 10/2006 |
| JP | 2007-025808 A | 2/2007 |
| JP | 2007-174400 A | 7/2007 |
| JP | 2008-130089 A | 6/2008 |
| JP | 2009-123009 A | 6/2009 |
| JP | 2009-302890 A | 12/2009 |
| JP | 2011-511370 A | 4/2011 |

* cited by examiner

*Primary Examiner* — Qian Yang
(74) *Attorney, Agent, or Firm* — Birch, Stewart, Kolasch & Birch, LLP

(57) ABSTRACT

A multifunction peripheral of the present invention includes: a display section that displays an information display screen; a storage section that stores information display screen setting data including default conditions for preparing the information display screen; and an information display screen preparation section that prepares the information display screen on the basis of the information display screen setting data, the information display screen preparation section (i) changing, in accordance with an instruction received from the server, at least one of the default conditions included in the information display screen setting data, and (ii) causing the display section to display the information display screen prepared on the basis of the information display screen setting data including the change.

5 Claims, 13 Drawing Sheets

| ID | EXTERNAL APPLICATION NAME | REGISTERED ADDRESS (URL) |
|----|---------------------------|--------------------------|
| 1  | IDENTIFICATION DOCUMENT COPYING | http://example.com/copy |
| 2  | VOUCHER PRINTING | http://example.com/print |

FIG. 5

```
<html>
 <body>
  <h2>IDENTIFICATION DOCUMENT COPYING APPLICATION</h2>
  <form>
    <p>Set identification document and press "COPY"</p>
    <p>for two-sided printing (This application can copy card such as driver's license)</p>
    <img src=" http://example.com/copy/mfpconf.png">
    <br/>
<a href=" http://example.com/copy/start.html">
<img src=" http://example.com/copy/start.png" align="right">
  </a>
```

FIG. 6

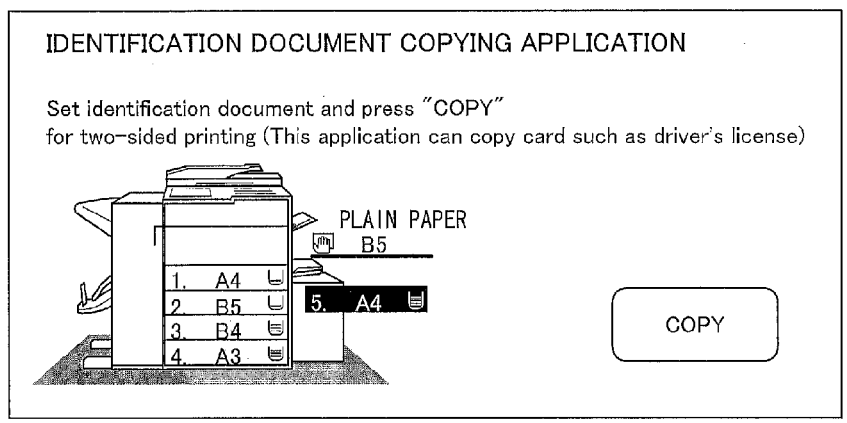

FIG. 7

```
<SOAP-ENV:Envelope
xmlns:SOAP-ENV="http://schemas.xmlsoap.org/soap/envelope/"
SOAP-ENV:encodingStyle="http://schemas.xmlsoap.org/soap/encoding/">
 <SOAP-ENV:Body>
  <ExecuteCopy>
   <Copy>1</Copy>
   ...
   <Preview>true<Preview>
   <PrevBack>http://example.com/copy/back.png</PrevBack>
   <PrevTitle>IDENTIFICATION DOCUMENT COPYING APPLICATION</PrevTitle>
   <PrevPageRotate>false</PrevPageRotate>
   <PrevPageDelete>true</PrevPageDelete>
 ...
  </ExecuteCopy>
 </SOAP-ENV:Body>
</SOAP-ENV:Envelope>
```

Select external application

DOCUMENT MANAGEMENT APPLICATION

VOUCHER PRINTING APPLICATION

| ID | APPLICATION NAME | REGISTERED ADDRESS |
|---|---|---|
| 1 | DOCUMENT MANAGEMENT APPLICATION | http://example.com/scan |
| 2 | VOUCHER PRINTING | http://example.com/print |

FIG. 16

```
<html>
 <body>
  <h2>DOCUMENT MANAGEMENT APPLICATION </h2>
  <form name="Auth" method="post" action="http://123.123.123.123/app/auth">
   <p>LOGIN NAME:<input type="text" name="login_name" size="50"></p>
   <p>PASSWORD:<input type="password" name="password" size="50"></p>
   <input type="submit" value="LOG IN">
   <input type="reset" value="RESET">
  </form>
 </body>
</html>
```

FIG. 17

DOCUMENT MANAGEMENT APPLICATION

LOGIN NAME: ☐

PASSWORD: ☐

[ LOG IN ]  [ RESET ]

FIG. 18

```
<html>
 <body>
  <h2>DOCUMENT MANAGEMENT APPLICATION</h2>
  <form name="Auth" method="post" action="http://123.123.123.123/app/auth">
   <p>LOGIN NAME:<input type="text" name="login_name" size="50"
                  src="http://123.123.123.123/app/keyboad.xml"></p>
   <p>PASSWORD:<input type="password" name="password" size="50"
                  src="http://123.123.123.123/app/keyboad.xml"></p>
   <input type="submit" value="LOG IN" >
   <input type="reset" value="RESET" >
  </form>
 </body>
</html>
```

FIG. 19

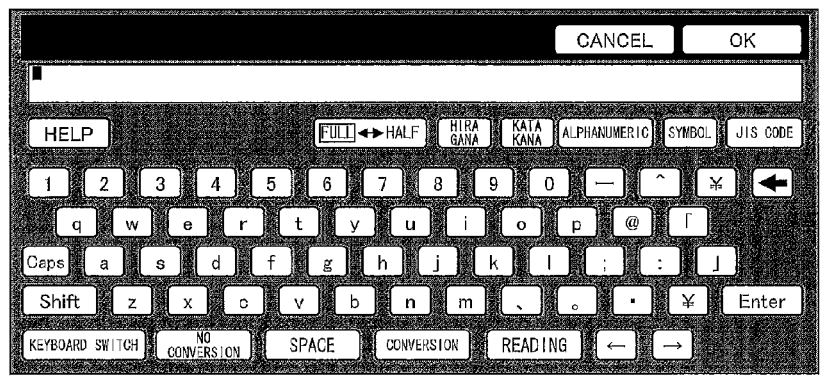

```
<KeyboardScr>
  <Title>LOGIN NAME<Title>
  <Background>white</Background>
  <KeyLayout>
    < key="a" key name="a" x="126" y="150"/>
    < key="b" key name="b" x="182" y="150"/>
    ...
    < key="z" key name="z" x="348" y="266"/>
    < key="1" key name="1" x="586" y="243"/>
    ...
    < key="0" key name="0" x="647" y="279"/>
  </KeyLayout>
  ...
</KeyboardScr>
```

MULTIFUNCTION PERIPHERAL, MULTIFUNCTION PERIPHERAL CONTROL SYSTEM, AND MULTIFUNCTION PERIPHERAL CONTROL METHOD FOR PREPARING INFORMATION DISPLAY SCREEN INCLUDING CHANGING DEFAULT CONDITIONS

This Nonprovisional application claims priority under 35U.S.C. §119(a) on Patent Application No. 2011-048884 filed in Japan on Mar. 7, 2011, and Patent Application No. 2011-086811 filed in Japan on Apr. 8, 2011, the entire contents of which are hereby incorporated by reference.

TECHNICAL FIELD

The present invention relates to a multifunction peripheral control system and a multifunction peripheral control method in each of which a multifunction peripheral and a server communicably connected to each other over a communications network operate in association with each other.

BACKGROUND ART

There has been known a technique of communicably connecting a multifunction peripheral (MFP) to a server over a communications network and thereby controlling the function of the MFP from the server (see, for example, Patent Literatures 1 through 4). This technique typically causes an application (MFP native application) operating on the MFP and an application operating on the server to control the operation of the MFP in association with each other.

There is also a technique of, in order to allow a user to input data such as a text at a MFP including no hardware keyboard, displaying a virtual keyboard (software keyboard) in a display section of the MFP so that the user can operate the virtual keyboard to input data.

The above virtual keyboard is, however, typically pre-installed in the MFP. As such, although the display style is uniform among respective display screens for application programs on the MFP (for example, among respective screens for execution of jobs such as copying and scanning), the above technique fails to make it possible to (i) change the design or layout of the virtual keyboard for each input item, input mode (for example, for full-width kana characters or alphanumeric characters), or application program, or (ii) customize the virtual keyboard for each user.

To solve the above problem, Patent Literature 5 discloses a technique of, in order to enable customization according to a user's needs and detailed data input for each input field, storing in advance (i) an input field and (ii) a virtual keyboard for use in data input to the input field in association with each other so that such data input is performed with use of the virtual keyboard associated with the input field.

CITATION LIST

Patent Literature 1
Japanese Patent Application Publication, Tokukai, No. 2005-080017 (Publication Date: Mar. 24, 2005)
Patent Literature 2
Japanese Patent Application Publication, Tokukai, No. 2006-277005 (Publication Date: Oct. 12, 2006)
Patent Literature 3
Japanese Patent Application Publication, Tokukai, No. 2007-174400 (Publication Date: Jul. 5, 2007)
Patent Literature 4
Japanese Patent Application Publication, Tokukai, No. 2008-130089 (Publication Date: Jun. 5, 2008)
Patent Literature 5
Japanese Patent Application Publication, Tokukai, No. 2007-025808 (Publication Date: Feb. 1, 2007)

SUMMARY OF INVENTION

Technical Problem

With the above configuration in which an application operating on a MFP and an application operating on a server control the operation of the MFP in association with each other, integrity in design is ruined by a difference between (i) an image displayed on an information display screen of the MFP by the application operating on the MFP and (ii) an image displayed on the information display screen of the MFP by the application operating on the server. This problematically confuses the user.

In the case where, for example, image data obtained by scanning at the MFP is displayed on the information display screen of the MFP as a preview image before the image data is subjected to a process such as copying, transmitting, filing, and image editing, the application operating on the MFP (standard function of the MFP) is typically set to prepare a preview image to display on the information display screen.

More specifically, preparing a preview image at the server requires such image data obtained by scanning to be transmitted from the MFP to the server. Transmitting image data before displaying a preview image is, however, contrary to the original purpose of displaying a preview image, that is, to allow the user to, before a process is executed with respect to the image data, check the preview image to determine whether to actually executing the process. As such, even with the configuration in which an application operating on a MFP and an application operating on a server control the operation of the MFP in association with each other, it is typically the application operating on the MFP that displays a preview image.

In the above case, however, a preview screen pre-installed in the application on the MFP is displayed on a screen customized by the application on the server (or displayed between instances of display of a screen customized by the application on the server). This ruins integrity in design, and may thereby confuse the user.

The present invention has been accomplished in view of the above problem. It is an object of the present invention to, with the configuration in which a multifunction peripheral and a server communicably connected to each other over a communications network control the operation of the multifunction peripheral in association with each other, allow a display screen prepared by an application operating on the multifunction peripheral to be displayed in a display style corresponding to that of a display screen prepared by an application operating on the server.

Solution to Problem

In order to solve the above problem, a multifunction peripheral of the present invention is a multifunction peripheral that is communicably connected over a communications network to a server which executes an application program and that executes a process according to an instruction by the application program, the multifunction peripheral including: a display section that displays an information display screen; a storage section that stores information display screen setting data including default conditions for preparing the information display screen; and an information display screen preparation section that prepares the information display screen on a basis of the information display screen setting data, the information display screen preparation section (i) changing, in accordance with an instruction received from the server, at least one of the default conditions included in the information display screen setting data, and (ii) preparing the information display screen on a basis of the information display screen setting data including the change.

With the above arrangement, the multifunction peripheral includes: a display section that displays an information display screen; a storage section that stores information display screen setting data including default conditions for preparing the information display screen; and an information display screen preparation section that prepares the information display screen on a basis of the information display screen setting data, the information display screen preparation section (i) changing, in accordance with an instruction received from the server, at least one of the default conditions included in the information display screen setting data, and (ii) preparing the information display screen on a basis of the information display screen setting data including the change. The above arrangement thereby makes it possible to (i) change, in accordance with an instruction by an application operating on the server connected to the multifunction peripheral over a communications network, an information display screen prepared by the information display screen preparation section, which operates on the multifunction peripheral, and consequently (ii) display the information display screen in a display style according to the application.

The multifunction peripheral may further include: an image forming section that executes an image forming process for forming, on a recording material, an image corresponding to second image data, wherein: the information display screen is a preview screen for, before the image forming process is executed, presenting a user with the image corresponding to the second image data; and the information display screen preparation section causes the display section to display, as the preview screen, the information display screen prepared by combining (i) first image data corresponding to the information display screen setting data including the change with (ii) the second image data.

The above arrangement makes it possible to (i) change, in accordance with an instruction by an application operating on the server connected to the multifunction peripheral over a communications network, a preview screen prepared by the multifunction peripheral, and consequently (ii) display the preview screen in a display style according to the application.

A multifunction peripheral control system of the present invention is a multifunction peripheral control system including: a server that executes an application program; and a multifunction peripheral that is communicably connected to the server over a communications network and that executes a process according to an instruction by the application program, the multifunction peripheral including: a display section that displays an information display screen which allows a user to input an instruction to the application program; a storage section that stores information display screen setting data including default conditions for preparing the information display screen; and an information display screen preparation section that prepares the information display screen on a basis of the information display screen setting data, the server transmitting an instruction to the multifunction peripheral in order to change at least one of the default conditions included in the information display screen setting data, the information display screen preparation section, when causing the display section to display the information display screen, (i) changing, in accordance with the instruction received from the server, at least one of the default conditions included in the information display screen setting data, and (ii) causing the display section to display the information display screen prepared on a basis of the information display screen setting data including the change.

With the above arrangement, the multifunction peripheral includes: a display section that displays an information display screen; a storage section that stores information display screen setting data including default conditions for preparing the information display screen; and an information display screen preparation section that prepares the information display screen on a basis of the information display screen setting data, the information display screen preparation section (i) changing, in accordance with an instruction received from the server, at least one of the default conditions included in the information display screen setting data, and (ii) causing the display section to display the information display screen prepared on a basis of the information display screen setting data including the change. The above arrangement thereby makes it possible to (i) change, in accordance with an instruction by an application operating on the server connected to the multifunction peripheral over a communications network, an information display screen prepared by the information display screen preparation section, which operates on the multifunction peripheral, and consequently (ii) display the information display screen in a display style according to the application.

A method of the present invention for controlling a multifunction peripheral is a method for controlling a multifunction peripheral that is communicably connected over a communications network to a server which executes an application program and that executes a process according to an instruction by the application program, the multifunction peripheral including: a display section that displays an information display screen; and a storage section that stores information display screen setting data including default conditions for preparing the information display screen, the method including: an information display screen preparing step for (i) changing, in accordance with an instruction received from the server, at least one of the default conditions included in the information display screen setting data, and (ii) preparing the information display screen on a basis of the information display screen setting data including the change; and an information display screen displaying step for causing the display section to display the information display screen.

According to the above method, the multifunction peripheral includes: a display section that displays an information display screen; and a storage section that stores information display screen setting data including default conditions for preparing the information display screen, the method (i) changing, in accordance with an instruction received from the server, at least one of the default conditions included in the information display screen setting data, and (ii) preparing the information display screen on a basis of the information display screen setting data including the change. The above arrangement thereby makes it possible to (i) change, in accordance with an instruction by an application operating on the server connected to the multifunction peripheral over a communications network, an information display screen prepared by an information display screen preparation section, which operates on the multifunction peripheral, and consequently (ii) display the information display screen in a display style according to the application.

The above multifunction peripheral may be in the form of a computer. In this case, the present invention further encompasses (i) a program for causing a computer to operate as each of the above sections to use the computer as the multifunction peripheral and (ii) a computer-readable storage medium that stores the program.

Advantageous Effects of Invention

As described above, in each of the multifunction peripheral, the multifunction peripheral control system, and the method for controlling a multifunction peripheral in accordance with the present invention, the multifunction peripheral (i) changes, in accordance with an instruction received from the server, at least one of the default conditions included in the information display screen setting data, and (ii) prepares the information display screen on a basis of the information display screen setting data including the change.

The above arrangement thereby makes it possible to (i) change, in accordance with an instruction by an application operating on the server connected to the multifunction peripheral over a communications network, an information display screen prepared by the information display screen preparation section, which operates on the multifunction peripheral, and consequently (ii) display the information display screen in a display style according to the application.

BRIEF DESCRIPTION OF DRAWINGS

FIG. 5 is an explanatory diagram showing an example of information display screen data transmitted from a server to the multifunction peripheral in the multifunction peripheral control system illustrated in FIG. 1.

FIG. 6 is an explanatory view illustrating an information display screen displayed by the display section of the multifunction peripheral on the basis of the information display screen data shown in FIG. 5.

FIG. 7 is an explanatory diagram showing an example of an execution start request for a copying process, the execution start request being transmitted from the server to the multifunction peripheral in the multifunction peripheral control system illustrated in FIG. 1.

FIG. 16 is an explanatory diagram showing an example of display screen data transmitted from the server to the multifunction peripheral in the multifunction peripheral control system illustrated in FIG. 1.

FIG. 17 is an explanatory view illustrating a display screen displayed by the display section of the multifunction peripheral on the basis of display screen data shown in FIG. 16.

FIG. 18 is an explanatory diagram showing another example of the display screen data transmitted from the server to the multifunction peripheral in the multifunction peripheral control system illustrated in FIG. 1.

FIG. 19 is an explanatory view illustrating an example of an operation input image displayed on the basis of operation input image data incorporated in advance in the multifunction peripheral of the multifunction peripheral control system illustrated in FIG. 1.

DESCRIPTION OF EMBODIMENTS

Embodiments of the present invention are described below.
(1-1. Overall Configuration of Multifunction Peripheral Control System 1)

Figure 1:
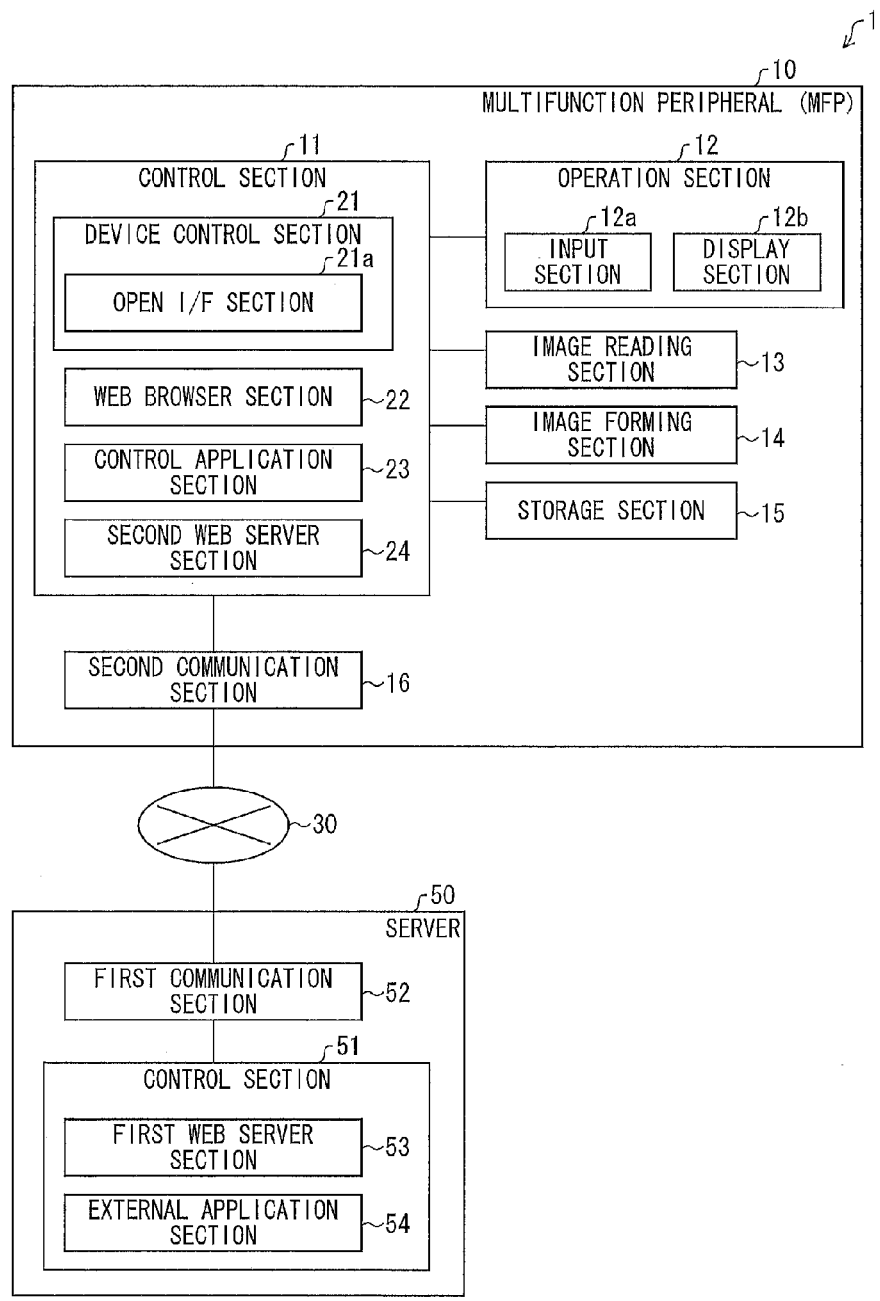
FIG. 1 is an explanatory diagram illustrating respective configurations of a multifunction peripheral and a multifunction peripheral control system of an embodiment of the present invention.

FIG. 1 is an explanatory diagram illustrating a configuration of a multifunction peripheral control system 1 of the present embodiment. The multifunction peripheral control system 1, as illustrated in FIG. 1, includes a multifunction peripheral (MFP) 10 and a server (application server) 50, which are communicably connected to each other over a communications network 30. The multifunction peripheral control system 1 may naturally include a plurality of multifunction peripherals 10 and a plurality of servers 50. The communications network 30 can be (i) a wired communication means such as an IEEE 1394 line, a USB line, a power line, a cable TV line, a telephone line, an ADSL line, and a serial cable or (ii) a wireless communication means such as infrared radiation (for example, IrDA infrared radiation and remote control infrared radiation), Bluetooth (registered trademark), IEEE802.11 wireless, HDR, a mobile phone network, a satellite line, and a terrestrial digital network. The multifunction peripheral 10 and the server 50 are arranged to communicate with each other with use of HTTP (Hyper Text Transfer Protocol), which is used for communication between a web server and a web browser (for example, to request and transmit a web page).

(1-2. Configuration of Multifunction Peripheral 10)

The multifunction peripheral 10 is a digital or analogue multifunction peripheral that (i) receives control information in HTML format from the server 50 with use of HTTP and (ii) on the basis of the control information received, performs various functions of the multifunction peripheral 10 (for example, a scanning function, a printing function, a copying function, a facsimile transmission and reception function, and a communicating function).

The multifunction peripheral 10 includes: a control section 11; an operation section 12; an image reading section (image data obtaining section) 13; an image forming section 14; a storage section 15; and a second communication section (image data obtaining section) 16. The control section (information display screen preparation section) 11 includes: a device control section (information display screen preparation section) 21; a web browser section 22; a control application section 23; and a second web server section 24.

The operation section 12 is a user interface that notifies a user of various information and that accepts an input from the user. The operation section 12 includes: an input section 12a including various input keys; and a display section 12b including, for example, a liquid crystal display (LCD). The operation section 12 may alternatively be a touch panel that integrally combines the input section 12a and the display section 12b.

The image reading section 13 includes: a scanner; and a document carrying section that carries a document to the scanner. The image reading section 13 performs the scanning function of scanning into image data a text, an image and/or the like printed on the document. The image reading section 13 scans an image at a predetermined resolution.

The image forming section 14 prints, on a recording sheet such as paper, an image (for example, a text, a photograph, and a graphic) corresponding to inputted image data. The image forming section 14 includes members such as a photoreceptor drum, a charging device, an exposure device, a developing device, a transfer device, a fixing device, and a sheet tray. Specifically, the image forming section 14 performs (i) the copying function of printing image data inputted from the image reading section 13 and (ii) the printer function of printing image data inputted from an external device.

The second communication section 16 is a communication interface that communicates with an external device such as the server 50 over the communications network 30. In the present embodiment, the second communication section 16 communicates with the server 50 with use of HTTP as described above. The second communication section 16 can, in the case where its access has a destination set to an IP address of the multifunction peripheral 10, also access the second web server section 24 included in the multifunction peripheral 10.

The control section 11 is a computer device constituted by members such as (i) an arithmetic processing section such as a CPU and a dedicated processor and (ii) a storage section (not shown) such as a RAM, a ROM, and a HDD. The control section 11 reads out (i) various information and (ii) programs for performing various controls, the various information and programs being stored in the storage section, and thereby executes the programs to perform the respective functions of the device control section 21, the web browser section 22, the control application section 23, and the second web server section 24.

The web browser section 22 operates in accordance with software of a general-purpose web browser. The web browser section 22 can communicate not only with a first web server section 53 of the server 50 through the second communication section 16, but also with the second web server section 24 included in the multifunction peripheral 10. In the present embodiment, the web browser section 22 is set to communicate with the first web server section 53 of the server 50 in the case where the control section 11 requests data of an information display screen and does not execute a control command to control various functions of the multifunction peripheral 10 (for example, the copying function). The web browser section 22 is set to communicate with the second web server section 24 of the multifunction peripheral 10 in the case where the control section 11 executes a control command to control various functions of the multifunction peripheral 10.

The second web server section 24 operates in accordance with software of a general-purpose web server. A web server is software that provides a function of a server being a part of the World Wide Web (WWW), which is an information system on the Internet. The second web server section 24 (i) receives a request (HTTP request) from the web browser section 22, (ii) causes an application according to the request to be executed, and (iii) transmits a response (HTTP response) to the web browser section 22.

The control application section 23 executes a process according to a web application operating on a web server. The control application section 23, in the case where various functions of the multifunction peripheral 10 (for example, the copying function) need to be controlled, transmits to the device control section 21a control command for controlling the functions. The control application section 23 may alternatively control the web browser section 22 in accordance with a control command in order to perform a communication control for transmitting, to the first web server section 53, unique information unique to the multifunction peripheral 10. This allows the functions of the multifunction peripheral 10 to be controlled.

The device control section 21 controls various functions of the multifunction peripheral 10. Specifically, the device control section 21 controls the respective operations of sections such as the image reading section 13, the image forming section 14, the second communication section 16, and the operation section 12.

The device control section 21, for example, controls the operation of the image reading section 13 to obtain data of a scanned image, and controls the operation of the image forming section 14 to form (output), on a recording material, an image corresponding to image data.

The device control section 21 has a unique operation mode and a cooperative operation mode. In the unique operation mode, which is unique to the multifunction peripheral 10, the device control section 21 causes the display section 12b to display an information display screen stored in advance in the multifunction peripheral 10, and receives, from the input section 12a, an instruction inputted to the information display screen. The device control section 21 thereby controls various functions of the multifunction peripheral 10 in accordance with the instruction. In the cooperative operation mode, the device control section 21 causes the display section 12b to display an information display screen received from the server 50, and performs the above control (i) on the basis of an instruction inputted to the information display screen and (ii) in accordance with a control instruction received from the control application section 23. The device control section 21, in the cooperative operation mode, alternatively causes the display section 12b to display an information display screen obtained by changing, in accordance with an instruction received from the server 50, at least a part of an information display screen stored in advance in the multifunction peripheral 10, and performs the above control (i) on the basis of an instruction inputted to the information display screen and (ii) in accordance with a control instruction received from the control application section 23.

In the unique operation mode, the device control section further performs controls such as a control of, in correspondence with the current configuration and state of the multifunction peripheral 10, (i) appropriately combining image information items in units of parts (constituent element images) stored in the storage section 15 and (ii) displaying the combination of image information items on an information display screen. The unique operation mode is commonly used in a conventional multifunction peripheral, and is not described here in further detail.

The device control section 21, upon receipt of an instruction for setting to the cooperative operation mode, activates the web browser section 22 and causes the web browser section 22 to execute a process according to a preset URL (in the present embodiment, a URL to request the first web server section 53 of the server 50 to transmit an initial information display screen). The device control section 21, in the cooperative operation mode, accepts a control command from the control application section 23 and performs a control according to the control command.

The device control section 21 includes an open I/F section 21a capable of accepting a control command that independent of the model of the multifunction peripheral 10. The open I/F section 21a opens, to the control application section 23, a control command to control various functions of the multifunction peripheral 10. The open I/F section 21a accepts a control command from the control application section 23, and converts the accepted control command into a command recognizable to the device control section 21.

The open I/F section 21a includes a conversion table storage section (not shown) that stores a conversion table associating (i) a control command open to the outside with (ii) a command recognizable to the device control section 21. The open I/F section 21a executes a process of converting a command with reference to the conversion table.

The open I/F section 21a is, as described above, capable of accepting a common control command that is independent of the model of the multifunction peripheral 10. This arrangement makes it possible to use a common web application for the operation of the control application section independently of the manufacture or model of the multifunction peripheral 10. As such, in the case where the control application section 23 is to be operated in accordance with a new web application, it is only necessary to install an identical application in each multifunction peripheral 10, thereby eliminating the need to change the web application of each multifunction peripheral 10 separately. This facilitates development of a web application for operating the control application section 23.

(1-3. Configuration of Server 50)

The server 50, as illustrated in FIG. 1, includes: a first communication section 52; and a control section 51. The control section 51 includes: a first web server section 53; and an external application section 54.

The control section 51 is a computer device constituted by members such as (i) an arithmetic processing section such as a CPU and a dedicated processor and (ii) a storage section (not shown) such as a RAM, a ROM, and a HDD. The control section 51 reads out (i) various information and (ii) programs for performing various controls, the various information and programs being stored in the storage section, and thereby executes the programs to perform the respective functions of the first web server section 53 and the external application section 54.

The first communication section 52 communicates with the multifunction peripheral 10 over, for example, a LAN or an Internet line. Further, the first communication section 52 communicates with the multifunction peripheral 10 with use of the HTTP communication protocol.

The first web server section 53 operates in accordance with software of a web server. The first web server section 53 has the function of (i) receiving a request (in the present embodiment, an HTTP request) from the multifunction peripheral 10 through the first communication section 52, and in response, (ii) transmitting, through the first communication section 52 to the multifunction peripheral 10, a file, image data, printing data, control information and/or the like according to the HTTP request.

The external application section 54, in response to an instruction from the first web server section 53, operates in accordance with a predetermined web application. In other words, the external application section 54 operates in accordance with various web applications operating on a web server.

In the case where, for example, a request (HTTP request) from the multifunction peripheral 10 is a request for transmission of an information display screen, the external application section 54 operates in accordance with an information display screen transmission application. Specifically, the external application section 54 (i) reads out, from a storage section (not shown) included in the server 50, HTML data of an information display screen indicated by the transmission request, and (ii) transmits the HTML data to the first web server section 53.

In the case where a request from the multifunction peripheral 10 is a request for transmission of printing data, the external application section 54 operates in accordance with a printing application. Specifically, the external application section 54 (i) obtains, from a folder with a name indicated by the transmission request, printing data having a designated file name, and (ii) transmits the printing data to the first web server section 53.

(1-4. Operation in Cooperative Operation Mode)

Figure 2:
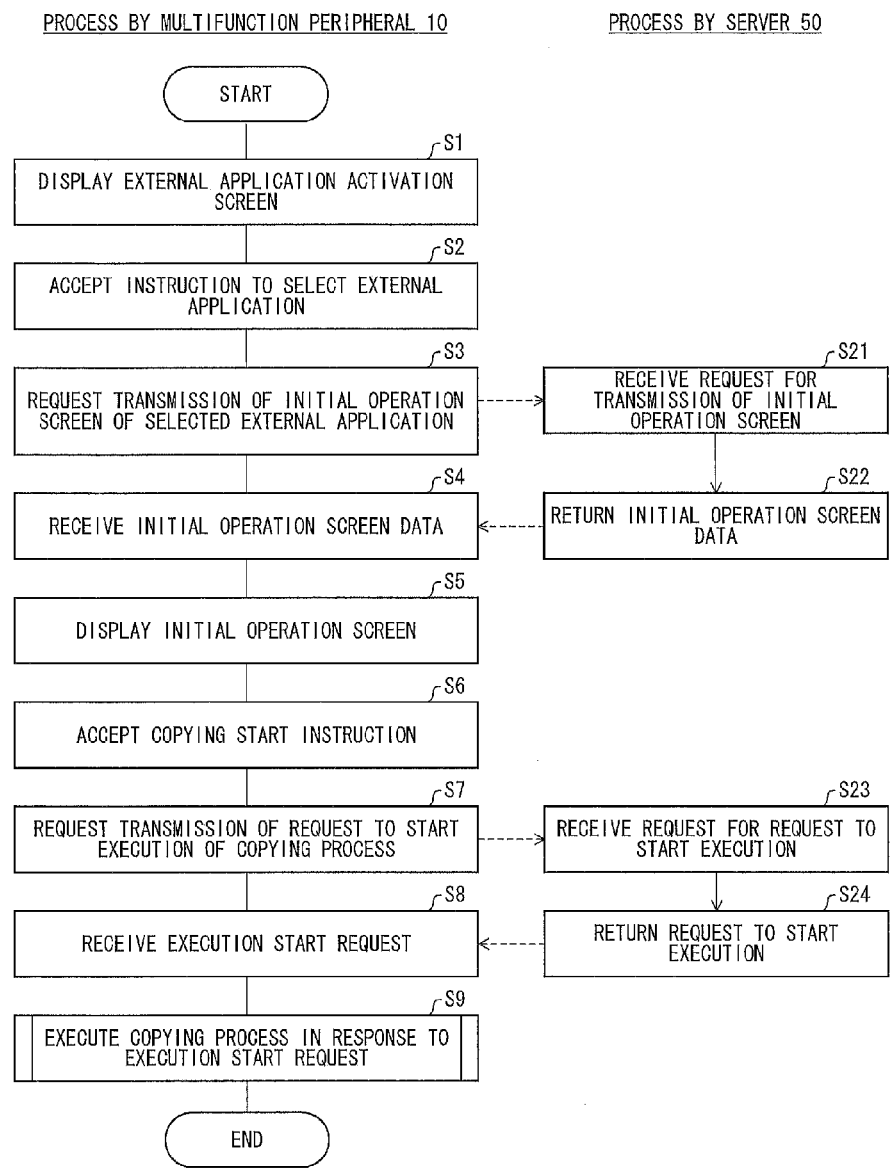
FIG. 2 is a flowchart illustrating an example of a process executed by the multifunction peripheral control system illustrated in FIG. 1.

The following describes, with reference to FIG. 2, an example process in the cooperative operation mode, in which the multifunction peripheral 10 and the server 50 execute a process in association with each other. FIG. 2 is a flowchart illustrating a flow of a process that causes preview image data prepared by the multifunction peripheral 10 and stored in the storage section 15 to be displayed (as a preview image) by the display section 12b under control of the external application section 54. The example below deals with a case involving use of an external application for executing a copying process.

Figures 3, 4:
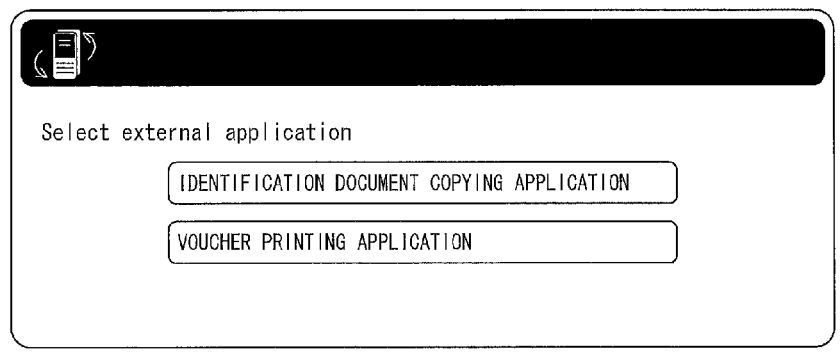
FIG. 3 is an explanatory view illustrating an example of an information display screen displayed by a display section of the multifunction peripheral illustrated in FIG. 1.
FIG. 4 is an explanatory diagram showing an example of a management table stored in the multifunction peripheral illustrated in FIG. 1.

First, the device control section 21 causes the display section 12b to display an external application activation screen (information display screen) (S1). FIG. 3 is an explanatory view illustrating an example of the external application activation screen to be displayed by the display section 12b. The external application activation screen may be based on (i) data that the storage section 15 stores in advance or (i) data that the device control section 21 obtains by accessing the server 50 through the second communication section 16.

Next, upon acceptance of a user's instruction inputted through the input section 12a to select an external application (S2), the device control section 21 activates the web browser section 22 and causes the web browser section 22 to transmit, to a URL associated with the selected external application, an HTTP Get command to request transmission of an initial operation screen (information display screen) (S3). Specifically, the storage section 15 stores in advance a management table associating (i) each external application displayed on the external application activation screen with (ii) a URL for requesting an initial operation screen for the external application. The device control section 21 obtains, from the management table, a URL for requesting transmission of an initial operation screen, and notifies the web browser section 22 of the URL in order to cause the web browser section 22 to transmit, to the URL, an HTTP Get command to request transmission of the initial operation screen. FIG. 4 is an explanatory diagram showing an example of the management table stored in the storage section 15.

The first web server section 53 of the server 50, upon receipt of the Get command (request for transmission of an initial operation screen) (S21), returns, to the multifunction peripheral 10, HTML data (initial operation screen data) of an initial operation screen (information display screen) corresponding to the Get command (S22).

The device control section 21 of the multifunction peripheral 10, when the second communication section 16 has received the initial operation screen data from the server 50 (S4), causes the display section 12b to display the initial operation screen (information display screen) corresponding to the received initial operation screen data (S5). FIG. 5 illustrates an example of HTML data returned from the server 50 to the multifunction peripheral 10. FIG. 6 illustrates an initial information display screen displayed by the display section 12b of the multifunction peripheral 10 on the basis of the HTML data.

Then, the device control section 21, upon acceptance of a process start instruction (in this example, a copying start instruction) from the user through the input section 12a (S6), controls the web browser section 22 so that the web browser section 22 transmits, to the server 50, a request (Get command) for transmission of a request to start execution of the process (S7).

The first web server section 53 of the server 50, upon receipt of the transmission request (S23), returns, to the multifunction peripheral 10, a request to start execution of the process (in this example, a copying process) corresponding to the transmission request (S24). This execution start request is a request addressed to the control application section 23. The multifunction peripheral 10 receives the start request at the second communication section 16, and transmits the start request to the control application section 23 through the second web server section 24. This start request can be performed by a method such as HTTP GET, POST, and SOAP. Further, this start request includes, for example, a designation of whether to display a preview screen. In the case where a preview screen is to be displayed, the start request includes constituent element information for the preview screen (that is, information for use in changing at least a part of constituent element images included among default conditions stored in the storage section 15 of the multifunction peripheral 10 for a preview screen [information display screen]).

FIG. 7 is an explanatory diagram showing an example of the execution start request for a copying process, and illustrates an example case in which the execution start request is a command based on SOAP. As illustrated in FIG. 7, the command of the execution start request includes a list of parameters necessary to execute a copying process. The command includes, for example: a <Copy> element that designates the number of copies to be produced; a <Preview> element that designates whether to display a preview screen for image data of an image to be copied (a preview screen is to be displayed if the <Preview> element is set to "true", and not to be displayed if the <Preview> element is set to "false"); a <PreviewBack> element (constituent element information) that designates a location which stores image data of a background image for the preview screen; and a <PrevTitle> element (constituent element information) that designates a title text to be displayed on the preview screen. The preview screen is displayed in correspondence with editing functions (for example, deleting a page, rotating a page, and changing the page order) that can be performed with respect to a displayed page. The above command includes information (constituent element information) indicative of whether such editing functions are each available ("true") or unavailable ("false"). For example, the command includes: a <PrevPageRotate> element (constituent element information) that designates whether a page rotation process is "true" or "false"; and a <PrevPageDelete> element (constituent element information) that designates whether a page deletion process is "true" or "false". Designating the above elements thereby makes it possible to customize a preview screen in correspondence with editing functions that can be performed.

The above arrangement may be altered such that (i) the storage section 15 of the multifunction peripheral 10 in advance stores preview screen setting data (information display screen setting data) including default information for use in preparing a preview screen and that (ii) the command transmitted from the server 50 to the multifunction peripheral includes only information (constituent element information) about a condition to be changed among the above default conditions. For example, the above command may include information (constituent element information) indicative of (i) among a plurality of constituent element images included in the preview image (information display screen), a constituent element image of which the display style is to be changed and (ii) the content of the change. The above constituent element images include, for example, a preview image, a background image, a button image, a text image, an icon image, and an image combining any of the above images. The above content of the change concerns, for example, (i) a color, size, shape, and display position of a constituent element image, (ii) a color, size, font, thickness, and display position of a text included in a constituent element image, and (iii) a combination of any of the above attributes.

The device control section 21, upon receipt of the execution start request from the server 50 through the second communication section 16 (S8), executes the process according to the received execution start request (S9), and ends the process. Specifically, the device control section 21 causes the control application section 23 to analyze the execution start request received from the server 50. The control application section 23 generates a control command on the basis of a result of the analysis, and transmits the generated control command to the device control section 21 (specifically, the open I/F section 21a). The open I/F section 21a of the device control section 21 converts the control command, received from the control application section 23, into a command recognizable to the device control section 21. The device control section 21 then controls various functions of the multifunction peripheral 10 on the basis of the command obtained as a result of the conversion.

Figure 8:
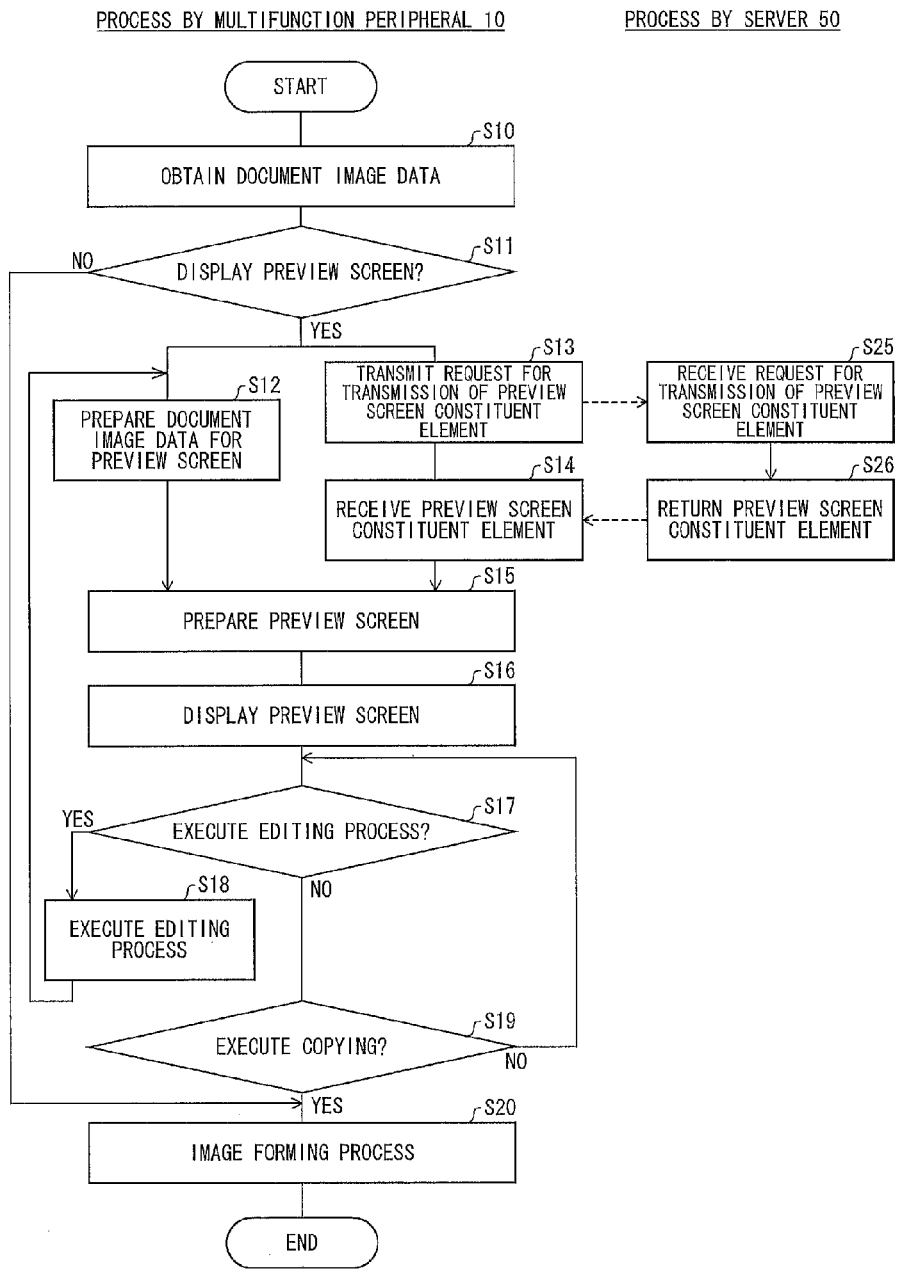
FIG. 8 is a flowchart illustrating a flow of a copying process executed by the multifunction peripheral control system illustrated in FIG. 1.

FIG. 8 is a flowchart illustrating a flow of the copying process executed in S9 of FIG. 2.

When the second communication section 16 has received from the server 50 an execution start request for a copying process (S8 in FIG. 2), the device control section 21 controls the image reading section 13 in accordance with the received execution start request so that the image reading section 13 (i) scans an image of a document to be copied and thereby (ii) obtains document image data of the document to be copied (S10).

Next, the device control section 21 determines whether to display a preview screen before image formation (S11). This determination is made in accordance with whether the <Preview> element included in the command of the execution start request received from the server 50 is set to "true" or "false".

If the device control section 21 has determined in S11 that a preview screen is not to be displayed, the device control section 21 controls the image forming section 14 so that the image forming section 14 forms, on a recording material, an image corresponding to the document image data (image forming process) (S20), and ends the process.

If the device control section 21 has determined in S11 that a preview screen is to be displayed, the device control section 21 prepares document image data for a preview screen on the basis of the document image data obtained by the image reading section 13 (S12), and causes the storage section 15 to store the prepared document image data. The document image data for a preview screen may be prepared by (i) the device control section 21 as described above or by (ii) an image processing section (not shown) of the multifunction peripheral 10 in accordance with an instruction by the device control section 21.

The device control section 21, while executing the process of preparing document image data for a preview screen, causes the control application section 23 to analyze preview screen configuration information (constituent element information) included in the copying execution start request. If it is necessary to obtain, from the external application section 54, information (preview screen constituent element) about a constituent element of the preview screen, the device control section 21 controls the web browser section 22 so that the web browser section 22 transmits, to the first web server section 53 of the server 50, a request for transmission of a preview screen constituent element (S13). The request for transmission of a preview screen constituent element can be performed by a method such as HTTP GET, POST, and SOAP. In the above description, the device control section 21 simultaneously executes the respective processes of preparing document image data for a preview screen and transmitting a request for transmission of a preview screen constituent element. The present embodiment is, however, not limited to such an arrangement. The device control section 21 may alternatively first execute one of the processes and then execute the other process.

The first web server section 53 of the server 50, upon receipt of the request for transmission of a preview screen constituent element (S25), returns the preview screen constituent element to the multifunction peripheral 10 (S26).

The device control section 21 of the multifunction peripheral 10, when the second communication section 16 has received the preview screen constituent element, (i) prepares a preview screen (image data for a preview screen) on the basis of the received preview screen constituent element and the preview screen document image data prepared in S12 (S15), and (ii) causes the display section 12b to display the prepared preview screen (S16). In the case where the device control section 21, at the time it has received the preview screen constituent element, has not yet completed the preparation of document image data for a preview screen, the device control section 21 may cause the storage section 15 to store the preview screen constituent element and wait for completion of the preparation of document image data for a preview screen. In this case, the device control section 21 may simply (i) read out the preview screen constituent element from the storage section 15 when the preparation of document image data for a preview screen is completed and (ii) combine the preview screen constituent element with the document image data for a preview screen. Further, a preview screen constituent element may designate an operation of obtaining, from a predetermined storage location, a parts image (constituent element image) to be included in a preview image. In this case, the device control section 21 (i) obtains a constituent element image from the storage location designated by the preview screen constituent element, and (ii) combines the constituent element image with the document image data for a preview screen and other constituent element images to prepare a preview screen (image data for a preview screen).

Figure 9:
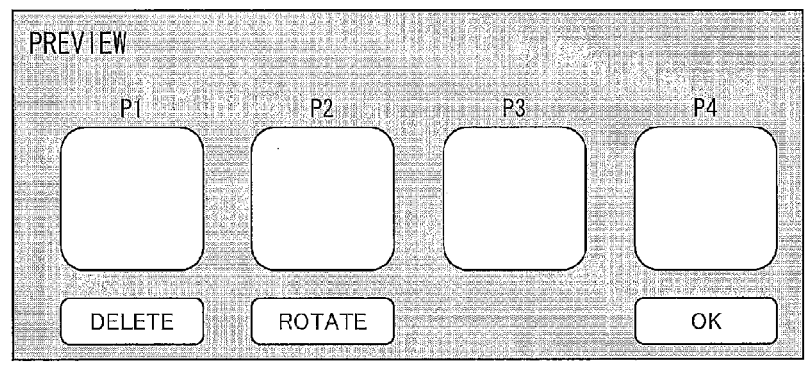
FIG. 9 is an explanatory view illustrating an example of a preview screen prepared on the basis of preview screen constituent elements incorporated in advance in the multifunction peripheral illustrated in FIG. 1.
Figure 10:
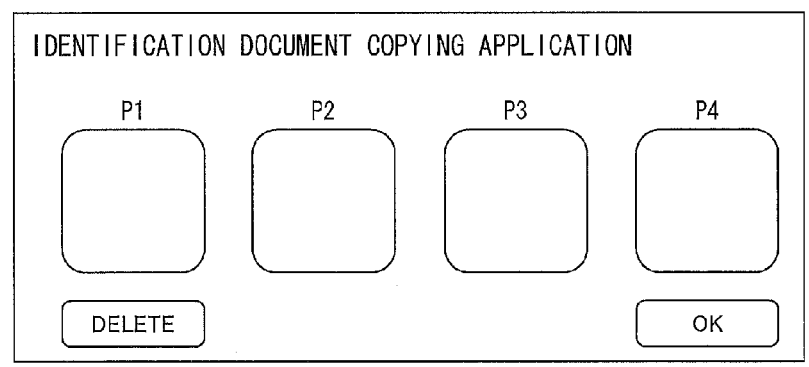
FIG. 10 is an explanatory view illustrating an example of a preview screen obtained by customizing, in the multifunction peripheral illustrated in FIG. 1, the preview screen of FIG. 9 in accordance with an instruction from the server.

FIG. 9 is an explanatory view illustrating an example of the preview screen prepared on the basis of one or more preview screen constituent elements incorporated in advance in the multifunction peripheral 10. FIG. 10 is an explanatory view illustrating an example of the preview screen prepared on the basis of preview screen constituent elements and an execution start request obtained from the server 50 (that is, the execution start request shown in FIG. 7).

In the execution start request shown in FIG. 7, the <PrevTitle> element indicative of a title is set to "IDENTIFICATION DOCUMENT COPYING APPLICATION". The preview screen of FIG. 10 consequently shows the title "IDENTIFICATION DOCUMENT COPYING APPLICATION" as changed from "PREVIEW" in the preview image of FIG. 9.

In the execution start request shown in FIG. 7, the <PrevPageRotate> element indicative of a rotating function for a preview screen is set to "false" (unavailable). As such, while the preview image of FIG. 9 displays a "ROTATE" button, the preview screen of FIG. 10 displays no "ROTATE" button.

In the execution start request of FIG. 7, the <PrevBack> element indicative of a location of a background image designates a URL. As such, the device control section 21 executes a process of obtaining a background image (preview screen constituent element) in S13 and S14. The preview screen of FIG. 10 consequently has a background image color that is changed from the background image color of the preview image of FIG. 9.

The appearance of a preview image which appearance is set in an execution start request is not limited to the above example. The execution start request may set, for example, a display position, display size, display color, shape, font, text size, design and/or the like of, for example, a title, a preview document image, a button indicative of an editing process (for example, a "DELETE" button or a "ROTATE" button) and/or an "OK" button for inputting an instruction to execute a copying process. The execution start request may alternatively be set to cause the device control section 21 to obtain image data of the above constituent elements from a designated URL(s).

As described above, the multifunction peripheral control system 1 of the present embodiment includes a multifunction peripheral 10 and a server 50 communicably connected to each other over a communications network 30, the multifunction peripheral 10 including: a display section 12b that displays an information display screen; a storage section 15 that stores information display screen setting data including default conditions for preparing the information display screen; and a device control section 21 that controls the respective operations of the display section 12b and the storage section 15, the server 50 transmitting an instruction to the multifunction peripheral 10 in order to change at least one of the default conditions included in the information display screen setting data, the device control section 21, when causing the display section 12b to display the information display screen, (i) changing, in accordance with the instruction received from the server 50, at least one of the default conditions included in the information display screen setting data, and (ii) causing the display section 12b to display an information display screen prepared on the basis of the information display screen setting data including the change.

This arrangement makes it possible to change, in accordance with an instruction by an application operating on the server 50 connected to the multifunction peripheral 10 over a communications network, an information display screen prepared by the device control section 21 operating in the multifunction peripheral 10. The above arrangement thereby allows such an information display screen to be displayed in a display style corresponding to the application.

For example, when displaying an information display screen, the multifunction peripheral 10 obtains, from an application (OSA application) operating on the server 50, display data of a background image, a message image, and/or a button image each to be included in the information display screen (that is, (i) image data of a parts image to be included in the information display screen, (ii) text data of a message to be included in the information display screen, or (iii) data indicative of where the image data and/or the text data is/are stored). This arrangement makes it possible to change individual items (for example, a message image and a button image) of an information display screen into respective images according to an instruction by the server 50 while allowing the multifunction peripheral 10 to control such functions as displaying an information display screen and editing an image. The above arrangement thereby allows an information display screen (for example, a preview screen) displayed under control of the multifunction peripheral 10 to look as if it is being displayed by an application operating on the server 50.

The present embodiment describes an example case of customizing, in accordance with an instruction by the server 50, a preview screen for displaying a preview image of document image data obtained by a scanning process executed during a copying process. The display screen that can be customized in accordance with an instruction by the server 50 is, however, not limited to that. For example, it is also possible to customize, in accordance with an instruction transmitted from the server 50 to the multifunction peripheral 10 and included in an execution start request for each process, a display condition and an operating condition for an information display screen of each of various applications (MFP Native applications) that are installed in the multifunction peripheral 10 and that each execute a function operable by the multifunction peripheral 10 by itself. Alternatively, the server 50 may obtain image data of constituent elements for an information display screen from a storage location designated by a URL, and thereby display the information display screen.

Figure 11:
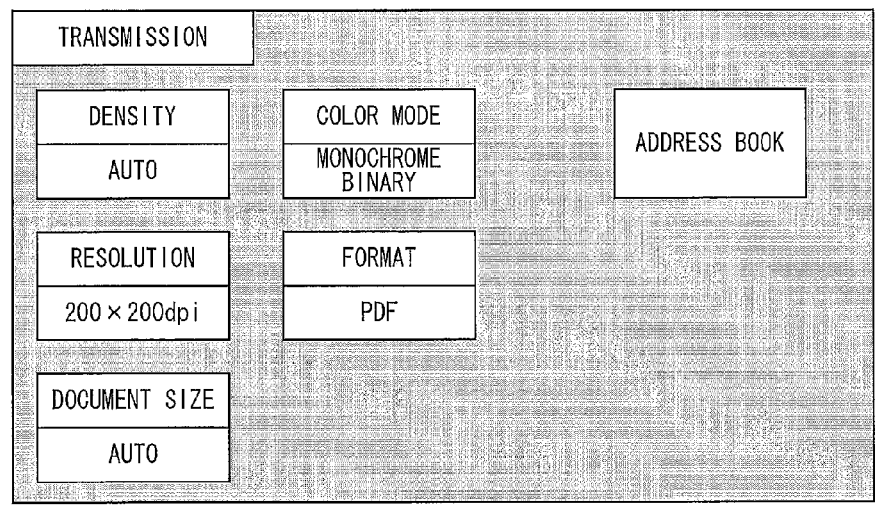
FIG. 11 is an explanatory view illustrating an example of an information display screen prepared on the basis of preview screen constituent elements incorporated in advance in the multifunction peripheral illustrated in FIG. 1.
Figure 12:
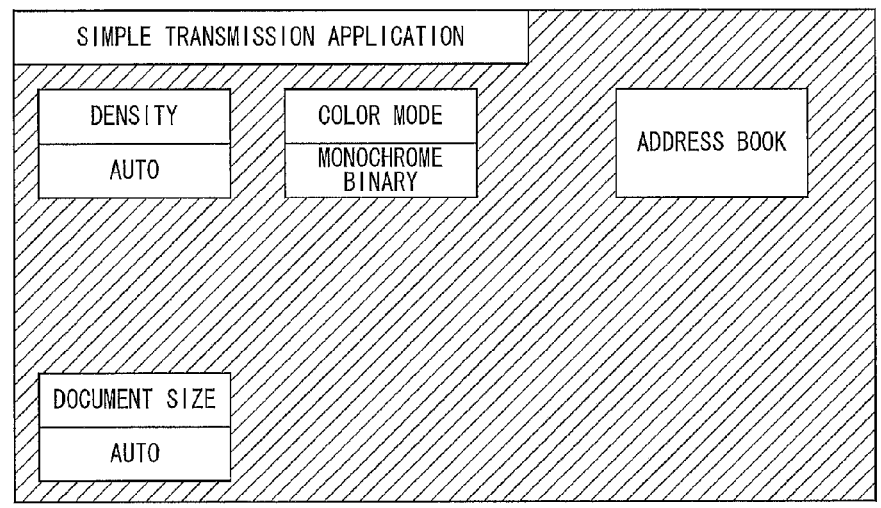
FIG. 12 is an explanatory view illustrating an example of an information display screen obtained by customizing, in the multifunction peripheral illustrated in FIG. 1, the information display screen of FIG. 11 in accordance with an instruction from the server.

FIG. 11 is an explanatory view illustrating an example of the information display screen for use in executing an image data transmission process for transmitting image data to another device, the information display screen being prepared on the basis of information display screen data incorporated in advance in the multifunction peripheral 10. FIG. 12 is an explanatory view illustrating an example of the information display screen obtained by customizing, in accordance with an instruction(s) included in an execution start request transmitted from the server 50 to the multifunction peripheral 10, the above information display screen for use in executing an image data transmission process.

In accordance with the instructions included in the execution start request transmitted from the server 50 to the multifunction peripheral 10, the example information display screen illustrated in FIG. 12 includes the title "SIMPLE TRANSMISSION APPLICATION" as changed from "TRANSMISSION" in FIG. 11, and also the title is shown in a different font. Further, the respective background images of the information display screens are different from each other in color between FIGS. 11 and 12. In addition, among the buttons that are displayed in the information display screen of FIG. 11 and that each indicate an item which can be set by the user, the button for setting resolution and the button for setting a file format have been deleted in FIG. 12.

[Embodiment 2]

Another embodiment of the present invention is described below. For convenience of explanation, members of the present embodiment that are identical in function to the respective equivalents in Embodiment 1 are each assigned the same reference numeral, and are not described here.

The above-mentioned technique of Patent Literature 5 is problematically troublesome in that it requires associating in advance an input field with a virtual keyboard for use in data input to the input field. Further, in the case where an operation is inputted to an application operating on a server, a virtual keyboard screen pre-installed in the application on the MFP is displayed on a screen prepared by the application on the server (or displayed between instances of display of a screen prepared by the application on the server). This ruins integrity in design, and may thereby problematically confuse the user.

A screen prepared by an application operating on a server and a virtual keyboard screen can be made uniform in design with each other by a method of causing the application operating on the server to prepare a virtual keyboard. (This arrangement has been conceived by the inventor of the present invention, and is not known art.) Such a method, however, problematically makes it difficult to execute a Japanese language input conversion process (text conversion process) such as conversion of kana characters (a type of Japanese character) into Chinese characters (that is, a mechanism of (i) displaying candidates for conversion of inputted text [kana characters] into Chinese characters and (ii) receiving selected Chinese characters as an input value). Specifically, a server typically provides a MFP with display screen data written in a markup language such as HTML, which display screen data is then analyzed by a browser in the MFP for display. Further, the above text conversion process is not a function of the browser, but a function (text conversion function) incorporated in the MFP for conversion of Japanese-language input. As such, with the arrangement in which a virtual keyboard screen is prepared by an application on the server and provided for the MFP, it is difficult to execute a text conversion process such as the above kana character/Chinese character conversion.

In view of this, the present embodiment describes a system that solves the above problem, in which system, with the arrangement in which a multifunction peripheral and a server communicably connected to each other over a communications network control the operation of the multifunction peripheral in association with each other, an operation input screen (operation input image) such as a virtual keyboard for use by a user to input text is displayed in a display style according to a display screen prepared by an application on the server.

(2-1. Operation of Cooperative Operation Mode)

A multifunction peripheral control system 1, a multifunction peripheral 10, and a server 50 of the present embodiment are identical in configuration to the respective equivalents illustrated in FIG. 1 referred to in the description of Embodiment 1. The description below, as such, does not deal with the respective configurations of the above three, and instead deals with a process that (i) is executed in the cooperative operation mode, in which the multifunction peripheral 10 and the server 50 execute a process in association with each other, and that (ii) causes the display section 12b of the multifunction peripheral 10 to display a virtual keyboard (operation input image) for use by a user to input text (data). Specifically, the description below deals with a process executed in the following case: After the multifunction peripheral 10 has (i) received, from the server 50, screen data including a control (text box) requiring a text input and (ii) caused the display section 12b to display the screen data, a user's selection of the control causes the display section 12b to display a virtual keyboard.

Figure 13:
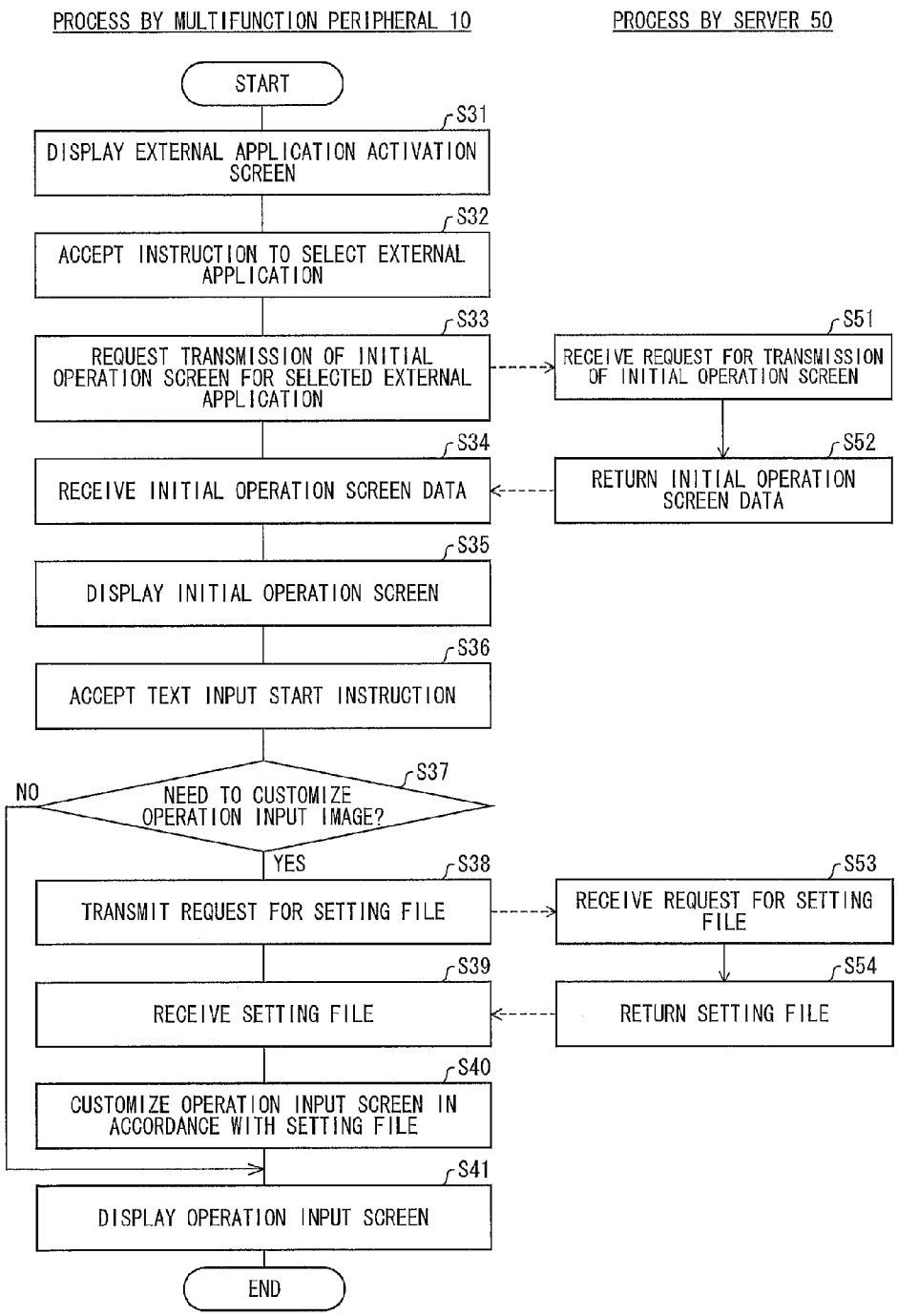
FIG. 13 is a flowchart illustrating an example of a process executed by the multifunction peripheral control system illustrated in FIG. 1.

FIG. 13 is a flowchart illustrating a flow of the above process.

Figures 14, 15:
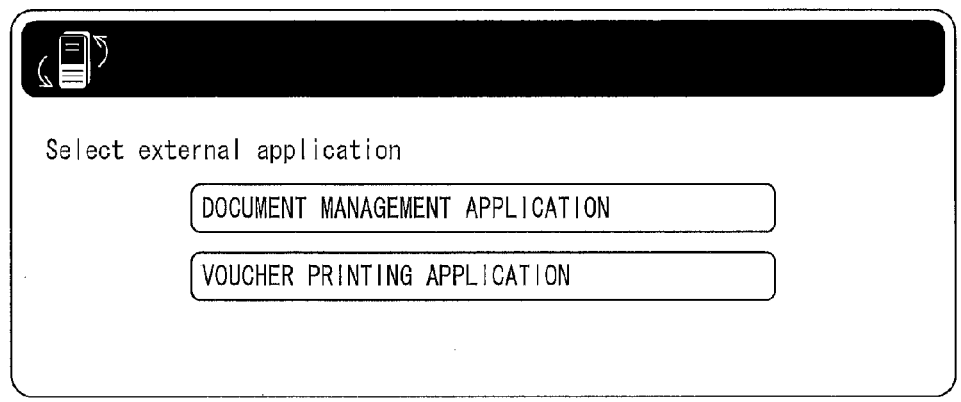
FIG. 14 is an explanatory view illustrating an example of a display screen displayed by the display section of the multifunction peripheral illustrated in FIG. 1.
FIG. 15 is an explanatory diagram showing an example of a management table stored in the multifunction peripheral and illustrated in FIG. 1.

First, the device control section 21 causes the display section 12b to display an external application activation screen (S31). FIG. 14 is an explanatory view illustrating an example of the external application activation screen to be displayed by the display section 12b. The external application activation screen may be based on (i) data that the storage section 15 stores in advance or (i) data that the device control section 21 obtains by accessing the server 50 through the second communication section 16.

Next, upon acceptance of a user's instruction inputted through the input section 12a to select an external application (S32), the device control section 21 activates the web browser section 22 and causes the web browser section 22 to transmit, to a URL associated with the selected external application, an HTTP Get command to request transmission of an initial operation screen (S33). Specifically, the storage section 15 stores in advance a management table associating (i) each external application displayed on the external application activation screen with (ii) a URL for requesting an initial operation screen for the external application. The device control section 21 obtains, from the management table, a URL for requesting transmission of an initial operation screen, and notifies the web browser section 22 of the URL in order to cause the web browser section 22 to transmit, to the URL, an HTTP Get command to request transmission of an initial operation screen. FIG. 15 is an explanatory diagram showing an example of the management table stored in the storage section 15.

The first web server section 53 of the server 50, upon receipt of the Get command (request for transmission of an initial operation screen) (S51), returns, to the multifunction peripheral 10, HTML data (initial operation screen data) of an initial operation screen corresponding to the Get command (S52).

The device control section 21 of the multifunction peripheral 10, when the second communication section 16 has received the initial operation screen data from the server 50 (S34), causes the display section 12b to display the initial operation screen corresponding to the received initial operation screen data (S35). FIG. 16 shows an example of HTML data of a login screen as an initial operation screen, the HTML data being returned from the server 50 to the multifunction peripheral 10. FIG. 17 illustrates a login screen (initial operation screen) displayed by the display section 12b of the multifunction peripheral 10 on the basis of the HTML data. The initial operation screen is not limited to such a login screen, but may be instead simply set as appropriate depending on the application.

Then, the device control section 21, upon acceptance of a text input start instruction from the user through the input section 12a (S36), determines whether it is necessary to customize (change) an operation input image stored in advance in the storage section 15 (S37). Specifically, the device control section 21 determines whether it is necessary to change default conditions for the preparation of an operation input image, the default conditions being included in default data stored in advance in the storage section 15.

The above text input start instruction is given in response to, for example, the user's selection of a text box (text input region; data input region) included in the initial operation screen (that is, a display screen according to an application operating on the server 50).

The above operation input image is, for example, (i) a virtual keyboard image (software keyboard image) for use by a user to input text, (ii) a handwriting input screen (handwriting input image) including a handwriting input region for a handwriting input involving use of, for example, a touch panel and any of various pointing devices, or (iii) an audio input image (audio input operation screen) for an audio input.

The device control section 21 determines whether the above customization is necessary, in accordance with, for example, whether the HTML data of a login screen includes an external link (that is, information indicative of a destination to which a request for obtaining a setting file is to be transmitted) from which to obtain a setting file (setting update data) for an operation input image associated with the text box.

FIG. 18 is an explanatory diagram showing an example case in which HTML data of a login screen associates a text box with an external link from which to obtain a setting file for an operation input image. In the example shown in FIG. 18, the HTML data is set so that when either the text box to the right of "LOGIN NAME" or the text box to the right of "PASSWORD" on the login screen illustrated in FIG. 17 is selected, a request for transmission of a setting file is transmitted to the external link src="http://123.123.123/app/keyboad.xml". The HTML data shown in FIG. 18 allows the display section 12b to display an operation input image that is similar to the operation input image (see FIG. 17) displayed by the display section 12b on the basis of the HTML data shown in FIG. 16.

The above setting file contains information such as information about: a display position, a display size and the like of the operation input image in the display section 12b; a parts image to be displayed in the operation input image and/or a parts image not to be displayed in the operation input image; a color, a size, a shape, a display position of each parts image to be displayed in the operation input image; a text to be included in the parts image to be displayed; a color, a size, a font, a thickness, and a display position of such a text; or a combination of any of the above.

If the device control section 21 has determined in S37 that it is not necessary to customize the operation input image, the device control section 21 causes the display section 12b to display an operation input image based on operation input image data stored in advance in the storage section 15 (S41), and ends the process. FIG. 19 illustrates an example of the operation input image displayed by the display section 12b on the basis of operation input image data stored in advance in the storage section 15.

If the device control section 21 has determined in S37 that it is necessary to customize the operation input image, the device control section 21 controls the web browser section 22 so that the web browser section 22 transmits an HTTP Get command, which requests transmission of a setting file, through the second communication section 16 to a location indicated by an external link included in the HTML data, obtained in S34, of the initial operation screen, from which location a setting file for an operation input image associated with the text box selected in S36 is to be obtained (S38). In the present embodiment, the destination to which a request for a setting file is transmitted is set to an address inside the server 50. The present invention is, however, not limited to such an arrangement. The destination to which a request for a setting file is transmitted may be, for example, another device provided separately from the server 50. The destination to which a request for a setting file is transmitted may alternatively be the second web server section 24 included in the multifunction peripheral 10. In the case where, for example, (i) the multifunction peripheral 10 stores in itself setting files customized for respective models (or respective display specifications) of a multifunction peripheral, and (ii) the external application section 54 designates loopback addresses (for example, http://123.123.123 . . . ->http://loopback address . . . ) corresponding to respective addresses at which the setting files are stored in the multifunction peripheral, the multifunction peripheral 10 can access the setting files stored in itself.

The first web server section 53 of the server 50, upon receipt of the transmission request (S53), returns, to the multifunction peripheral 10, a setting file corresponding to the transmission request (S54).

The device control section 21 of the multifunction peripheral 10, when the second communication section 16 has received the setting file from the server 50 (S39), customizes, in accordance with the setting file received, the operation input screen stored in advance in the storage section 15 (S40). The device control section 21 then causes the display section 12b to display the customized operation input screen (S41), and ends the process.

Figures 20, 21:
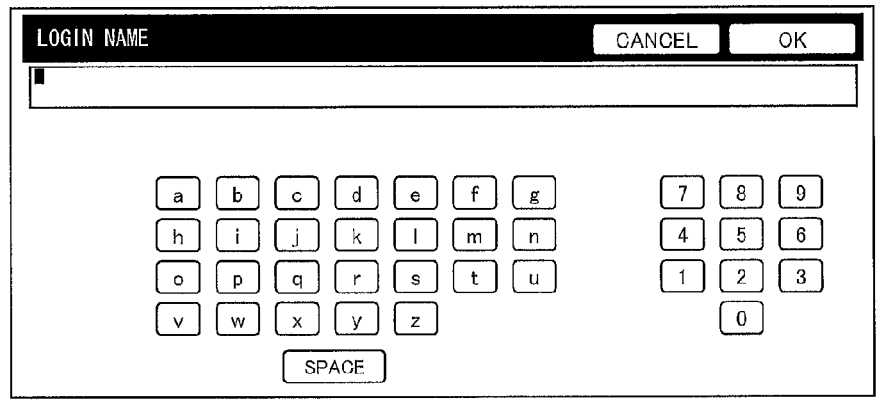
FIG. 20 is an explanatory view illustrating an operation input image obtained by customizing the operation input image of FIG. 19 in accordance with the setting file shown in FIG. 21.
FIG. 21 is an explanatory diagram showing an example of a setting file for customizing an operation input image, the setting file being transmitted from the server to the multifunction peripheral in the multifunction peripheral control system illustrated in FIG. 1.

FIG. 21 is an explanatory diagram showing an example of the setting file transmitted from the server 50 to the multifunction peripheral 10. In other words, FIG. 21 shows an example setting file corresponding to src="http://123.123.123/app/keyboad.xml". FIG. 20 is an explanatory view illustrating a result of customizing, in accordance with the setting file shown in FIG. 21, the operation input image stored in advance in the storage section 15. The examples of FIGS. 20 and 21, in order to limit text usable for an input of a login name to alphanumeric characters, change the keybutton images included in the operation input image, illustrated in FIG. 19, based on the default data (that is, the operation input image prepared on the basis of the default data stored in advance in the storage section 15) so that (i) keybutton images unnecessary to input alphanumeric characters are not displayed and (ii) the respective display positions of the keybutton images to be displayed are changed from those in FIG. 19.

The example shown in FIG. 21 includes a <Title> element, which is set to the text "LOGIN NAME". This setting causes the title "LOGIN NAME" to be displayed at a portion of the operation input screen as illustrated in FIG. 20. More specifically, while the operation input image stored in the storage section 15 (see FIG. 19) displays no title, the operation input image as customized on the basis of the setting file displays the title "LOGIN NAME".

The example shown in FIG. 21 includes a <Background> element, which designates a background color of the operation input image. With this setting, while the operation input image illustrated in FIG. 19, the operation input image being observed before customization, has a basic background color of white, the customized operation input image illustrated in FIG. 20 has a basic background color of black as changed from white. Note that while the above description deals with an example case of changing the basic color of the background, the device control section 21 may, as an alternative example, prepare a background image on the basis of image data obtained from a designated URL at which image data of an image to be displayed in the background is stored.

The example shown in FIG. 21 includes a <KeyLayout> element, which designates (i) information for specifying, among the keybutton images included in the operation input image stored in advance in the storage section 15, keybutton images to be displayed after customization and (ii) respective display positions of such keybutton images to be displayed. More specifically, the <KeyLayout> element specifies attribute values (namely, a key attribute, a key name attribute, an x attribute, and a y attribute) of each keybutton image to be included in the operation input image.

The key attribute is an attribute indicative of a key as a setting target. For example, the attribute value key="α" indicates that the setting concerns the key "a". The key name attribute indicates the name of a keybutton image. The x attribute indicates a display position along a horizontal direction (x direction) of the display section 12b, whereas the y attribute indicates a display position along a vertical direction (y direction) of the display section 12b. As such, the attributes x="126" y="150" set for the key "a", for example, designate locating a keybutton at a position expressed by the coordinates x="126" and y="150", assuming that the upper left corner of the screen has the coordinates x=0 and y=0.

As described above, the multifunction peripheral control system 1 of the present embodiment includes: a multifunction peripheral 10 and a server 50 communicably connected to each other over a communications network 30, the multifunction peripheral 10 including: a display section 12b that displays an operation input image for use by a user to input text; an input section (input accepting section) 12a that accepts the user's text input to the operation input image; a storage section 15 that stores default data including default conditions for preparing the operation input image; and a device control section (information display screen preparation section; image preparing section) 21 that prepares the operation input image on the basis of the default data, the device control section 21 (i) changing, in accordance with setting update data received from the server 50, at least one of the default conditions included in the default data, and (ii) causing the display section 12b to display an operation input image prepared on the basis of the default data including the change.

This arrangement can (i) change an operation input image, incorporated in advance in the multifunction peripheral 10, in accordance with an instruction by an application operating on the server 50 connected to the multifunction peripheral 10 over a communications network, and (ii) display the operation input image as changed. The above arrangement consequently allows an operation input screen for use by a user in text input to be displayed in a display style according to a display screen prepared by the application on the server 50.

The above operation input image may be displayed either in the entire display section 12b or at a portion of the display section 12b. The operation input image may, for example, be displayed at a portion of a display screen corresponding to an application on the server 50.

In each of the embodiments, each section (block) included in the multifunction peripheral 10 and/or the server 50, particularly the control section 11 of the multifunction peripheral 10 and/or the control section 51 of the server 50, may be realized by software by using a processor such as a CPU. In this case, the multifunction peripheral 10 and/or the server 50 may include: a CPU (central processing unit) for executing a program for realizing functions of each section; a ROM (read only memory) that stores the program; a RAM (random access memory) that develops the program; a storage device (storage medium) such as a memory in which the program and various data are stored; and the like. In this case, the object of the present invention can be realized in such a manner that the multifunction peripheral 10 and/or the server 50 is provided with a computer-readable storage medium for storing program codes (such as executable program, intermediate code program, and source program) of control programs of the multifunction peripheral 10 and/or the server 50 which programs serve as software for realizing the functions, and a computer (alternatively, a CPU or an MPU) reads out and executes the program codes stored in the storage medium.

Examples of the storage medium include (i) a tape such as a magnetic tape and a cassette tape, (ii) a disk including a magnetic disk such as a Floppy (Registered Trademark) disk and a hard disk, and an optical disk such as a CD-ROM, an MO, an MD, a DVD, and a CD-R, (iii) a card such as an IC card (including a memory card) and an optical card, and (iv) a semiconductor memory realized by a mask ROM, an EPROM, an EEPROM, a flash ROM, and the like.

The multifunction peripheral 10 and/or the server 50 can be connected to a communication network, via which the program codes can be supplied to the multifunction peripheral 10 and the server 50. Such a communication network is not particularly limited. Examples of the communication network includes the Internet, an intranet, an extranet, a LAN, ISDN, VAN, a CATV communications network, a virtual private network, a telephone network, a mobile telecommunications network, and a satellite communication network. A transmission medium of which a communication network is composed is not particularly limited. Examples of the transmission medium includes (i) a wired transmission medium such as IEEE1394, a USB, a power-line carrier, a cable TV circuit, a telephone line, and an ADSL line and (ii) a wireless transmission medium such as an infrared communication system such as IrDA and a remote controller, Bluetooth (Registered Trademark), 802.11 wireless communication system, HDR, a mobile phone network, a satellite line, and a digital terrestrial network. Note that the present invention can also be realized in the form of a computer data signal in which the program codes are embodied by an electronic transmission and which is embedded in carrier waves.

Further, each block of the multifunction peripheral 10 or the server 50 is not necessarily realized by software, but may be realized by hardware logic, and may be realized by a combination of hardware carrying out some of the processes and computing means controlling the hardware and executing program code for the other processes.

The present invention is not limited to the description of the embodiments above, but may be altered in various ways by a skilled person within the scope of the claims. Any embodiment based on a proper combination of technical means disclosed in different embodiments is also encompassed in the technical scope of the present invention.

A multifunction peripheral of the present invention is, as described in the embodiments above, multifunction peripheral that is communicably connected over a communications network to a server which executes an application program and that executes a process according to an instruction by the application program, the multifunction peripheral including: a display section that displays an information display screen; a storage section that stores information display screen setting data including default conditions for preparing the information display screen; and an information display screen preparation section that prepares the information display screen on a basis of the information display screen setting data, the information display screen preparation section (i) changing, in accordance with an instruction received from the server, at least one of the default conditions included in the information display screen setting data, and (ii) preparing the information display screen on a basis of the information display screen setting data including the change.

With the above arrangement, the multifunction peripheral includes: a display section that displays an information display screen; a storage section that stores information display screen setting data including default conditions for preparing the information display screen; and an information display screen preparation section that prepares the information display screen on a basis of the information display screen setting data, the information display screen preparation section (i) changing, in accordance with an instruction received from the server, at least one of the default conditions included in the information display screen setting data, and (ii) preparing the information display screen on a basis of the information display screen setting data including the change. The above arrangement thereby makes it possible to (i) change, in accordance with an instruction by an application operating on the server connected to the multifunction peripheral over a communications network, an information display screen prepared by the information display screen preparation section, which operates on the multifunction peripheral, and consequently (ii) display the information display screen in a display style according to the application.

The multifunction peripheral may be arranged such that the information display screen preparation section causes the display section to display an information display screen obtained by changing, in accordance with an instruction received from the server, the display style of at least one of a plurality of constituent element images included in the information display screen to be prepared on the basis of the default conditions. The information display screen preparation section may, for example, cause the display section to display an information display screen obtained by changing, in accordance with an instruction received from the server, at least one of (i) a color, size, shape, and display position of a constituent element image and (ii) a color, size, font, thickness, and display position of a text included in a constituent element image. Further, the constituent element image may be, for example, a background image, a button image, a text image, an icon image, and an image combining any of the above images.

The above arrangement makes it possible to (i) change, in accordance with an instruction by an application operating on the server connected to the multifunction peripheral over a communications network, the display style of a constituent element image included in an information display screen, and consequently (ii) display the information display screen in a display style according to the application.

The multifunction peripheral may be arranged such that the information display screen preparation section causes the display section to display an information display screen obtained by deleting, in accordance with an instruction received from the server, at least one of a plurality of constituent element images included in the information display screen to be prepared on the basis of the default conditions.

The above arrangement (i) makes it possible to select a constituent element image corresponding to a process to be executed by an application operating on the server connected to the multifunction peripheral over a communications network, and consequently (ii) include the constituent element image in an information display screen to be displayed.

The multifunction peripheral may be arranged such that the information display screen preparation section causes the display section to display an information display screen obtained by replacing (i) at least one of a plurality of constituent element images included in an information display screen to be prepared on the basis of the default conditions with (ii) a constituent element image obtained from an address designated in an instruction received from the server.

The above arrangement makes it possible to (i) obtain a constituent element image according to an instruction by an application operating on the server connected to the multifunction peripheral over a communications network, and thereby (ii) change the information display screen on the basis of the constituent element image obtained.

The multifunction peripheral may further include: an image forming section that executes an image forming process for forming, on a recording material, an image corresponding to second image data; the information display screen is a preview screen for, before the image forming process is executed, presenting a user with the image corresponding to the second image data; and the information display screen preparation section causes the display section to display, as the preview screen, the information display screen prepared by combining (i) first image data corresponding to the information display screen setting data including the change with (ii) the second image data.

The above arrangement makes it possible to (i) change, in accordance with an instruction by an application operating on the server connected to the multifunction peripheral over a communications network, a preview screen prepared by the multifunction peripheral, and consequently (ii) display the preview screen in a display style according to the application.

The multifunction peripheral may further include: an image data obtaining section that executes an image data obtaining process for obtaining the image data, wherein: the information display screen preparation section simultaneously executes (i) the image data obtaining process and (ii) the process of changing, in accordance with the instruction received from the server, at least one of the default conditions included in the information display screen setting data, and preparing image data of the information display screen on a basis of the information display screen setting data including the change. The image data obtaining section may, for example, (i) obtain image data of a scanned document, (ii) obtain image data from another device connected to the multifunction peripheral over a communications network, or (iii) read out image data from a storage medium detachably connected to either the storage section included in the multifunction peripheral or the multifunction peripheral.

The above arrangement makes it possible to simultaneously (i) execute the image data obtaining process and (ii) the process of changing, in accordance with the instruction received from the server, at least one of the default conditions included in the information display screen setting data, and preparing image data of the information display screen on a basis of the information display screen setting data including the change. The above arrangement thereby shortens a period necessary before a preview screen is displayed.

The multifunction peripheral may be arranged such that the display section displays, as the information display screen, an operation input image for use by a user to input text; the storage section stores, as the information display screen setting data, default data including default conditions for preparing the operation input image; the information display screen preparation section prepares the operation input image on a basis of the default data; the multifunction peripheral further includes an input accepting section that accepts a text input by the user for the operation input image; and the information display screen preparation section (i) changes, in accordance with setting update data included in an instruction received from the server, at least one of the default conditions included in the default data, and (ii) causes the display section to display, as the information display screen, the operation input image prepared on a basis of the default data including the change.

With the above arrangement, the multifunction peripheral includes: a display section that displays an operation input image for use by a user to input text; an input accepting section that accepts the user's text input to the operation input image; a storage section that stores default data including default conditions for preparing the operation input image; and an image preparing section that prepares the operation input image on the basis of the default data. The multifunction peripheral (i) changes, in accordance with setting update data received from the server, at least one of the default conditions included in the default data, and (ii) causes the display section to display an operation input image prepared on a basis of the default data including the change. The multifunction peripheral, in other words, (i) changes, in accordance with an instruction by an application operating on the server connected to the multifunction peripheral over a communications network, an operation input image incorporated in advance in the multifunction peripheral, and (ii) display the operation input image. This arrangement allows an operation input screen for use by a user in text input to be displayed in a display style according to a display screen prepared by the application on the server.

The multifunction peripheral may be arranged such that: the display section displays an operation screen corresponding to operation screen data received from the application program; the input accepting section accepts the user's operation input to the operation screen; and the information display screen preparation section, in the case where the operation input accepted by the input accepting section is an instruction to select an input item requiring the user's text input to the operation screen, (i) requests, to a request destination associated with the input item and indicated by the operation screen data, transmission of setting update data corresponding to the input item and (ii) changes at least one of the default conditions in correspondence with setting update data included in a response to the request.

The above arrangement makes it possible to, in response to the user's instruction to select an input item requiring text input to the operation screen, automatically (i) obtain setting update data corresponding to the input item, and automatically (ii) change the display style of an operation input image in correspondence with the obtained setting update data for a display of the operation input image.

The multifunction peripheral may be arranged such that the default conditions included in the default data include information indicative of a plurality of parts images to be displayed in the first operation input image; and the setting update data is information for changing the default conditions, included in the default data, so that at least one of the plurality of parts images is displayed in the first operation input image and that a rest of the plurality of parts images is not displayed in the first operation input image. The multifunction peripheral may, for example, be arranged such that: the plurality of parts images included in the default conditions include keybutton images for use by the user for a selection instruction; and the setting update data is information for changing the default conditions so that at least one of the keybutton images is displayed in the operation input image and (ii) the rest of the keybutton images is not displayed in the operation input image.

The above arrangement makes it possible to change the operation input image so that among the parts images included in the default conditions, (i) only necessary parts images are displayed and (ii) parts images unnecessary for the display are not displayed.

The multifunction peripheral may be arranged such that: the default conditions include information indicative of a plurality of parts images to be displayed in the operation input image; and the setting update data is information for changing, among the default conditions, at least one of: a display position of the operation input image; a display size of the operation input image; a parts image to be displayed in the operation input image; a color, size, shape, and display position of a parts image to be displayed in the operation input image; a text included in a parts image to be displayed in the operation input image; and a color, size, font, thickness, and display position of a text included in a parts image to be displayed in the operation input image.

The above arrangement makes it possible to (i) change, in accordance with an instruction by an application operating on the server connected to the multifunction peripheral over a communications network, the display style of either the operation input image or that of a parts image included in the operation input image, and consequently (ii) display the operation input image in a display style according to the application.

The multifunction peripheral may be arranged such that: the setting update data includes information for specifying a location at which is stored a setting file indicative of the content of a change to the default conditions; and the information display screen preparation section (i) obtains the setting file on the basis of the setting update data and (ii) prepares the operation input image on the basis of the setting file obtained.

With the above arrangement, even in the case where, for example, the default conditions for preparing the operation input image vary according to the model of a multifunction peripheral, simply designating a storage location of a setting file through an application operating on the server, connected to the multifunction peripheral over a communications network, makes it possible to display an operation input image suitable for the application.

The multifunction peripheral may be arranged such that: the storage section stores, in correspondence with a plurality of display specifications, one or more setting files each indicative of the content of a change to the default conditions; the setting update data includes information for specifying either a setting file for use in the preparation of the operation input image or a storage location of the setting file; and the information display screen preparation section (i) reads out, from the storage section, the setting file specified in the setting update data and (ii) prepares the operation input image on the basis of the setting file read out.

With the above arrangement, even in the case where, for example, the default conditions for preparing the operation input image vary according to the model of a multifunction peripheral, simply designating either the setting file or a storage location of the setting file through an application operating on the server, connected to the multifunction peripheral over a communications network, makes it possible to display an operation input image suitable for the application. The multifunction peripheral may be further arranged such that: the storage section stores a plurality of setting files corresponding to a plurality of display specifications; and the information for specifying the setting file designates a display specification for the operation input image. With this arrangement, in the case where an application operating on the server designates a display specification for the operation input image, the multifunction peripheral can cause the display section to display an operation input image corresponding to the display specification.

A multifunction peripheral control system of the present invention is a multifunction peripheral control system including: a server that executes an application program; and a multifunction peripheral that is communicably connected to the server over a communications network and that executes a process according to an instruction by the application program, the multifunction peripheral including: a display section that displays an information display screen; a storage section that stores information display screen setting data including default conditions for preparing the information display screen; and an information display screen preparation section that controls respective operations of the display section and the storage section, the server transmitting an instruction to the multifunction peripheral in order to change at least one of the default conditions included in the information display screen setting data, the information display screen preparation section, when causing the display section to display the information display screen, (i) changing, in accordance with the instruction received from the server, at least one of the default conditions included in the information display screen setting data, and (ii) causing the display section to display the information display screen prepared on a basis of the information display screen setting data including the change.

With the above arrangement, the multifunction peripheral includes: a display section that displays an information display screen; a storage section that stores information display screen setting data including default conditions for preparing the information display screen; and an information display screen preparation section that prepares the information display screen on a basis of the information display screen setting data, the information display screen preparation section (i) changing, in accordance with an instruction received from the server, at least one of the default conditions included in the information display screen setting data, and (ii) preparing the information display screen on a basis of the information display screen setting data including the change. The above arrangement thereby makes it possible to (i) change, in accordance with an instruction by an application operating on the server connected to the multifunction peripheral over a communications network, an information display screen prepared by the information display screen preparation section, which operates on the multifunction peripheral, and consequently (ii) display the information display screen in a display style according to the application.

The multifunction peripheral control system may be arranged such that the display section displays, as the information display screen, an operation input image for use by the user to input text; the storage section stores, as the information display screen setting data, default data including default conditions for preparing the operation input image; the information display screen preparation section prepares the operation input image on a basis of the default data; the multifunction peripheral further includes an input accepting section that accepts a text input by the user for the operation input image; and the information display screen preparation section (i) changes, in accordance with setting update data included in the instruction received from the server, at least one of the default conditions included in the default data, and (ii) causes the display section to display, as the information display screen, the operation input image prepared on a basis of the default data including the change.

The above arrangement allows an operation input screen for use by the user in text input to be displayed in a display style according to a display screen prepared by the application on the server.

A method of the present invention for controlling a multifunction peripheral is a method for controlling a multifunction peripheral that is communicably connected over a communications network to a server which executes an application program and that executes a process according to an instruction by the application program, the multifunction peripheral including: a display section that displays an information display screen; and a storage section that stores information display screen setting data including default conditions for preparing the information display screen, the method including: an information display screen preparing step for (i) changing, in accordance with an instruction received from the server, at least one of the default conditions included in the information display screen setting data, and (ii) preparing the information display screen on a basis of the information display screen setting data including the change; and an information display screen displaying step for causing the display section to display the first information display screen.

According to the above method, the multifunction peripheral includes: a display section that displays an information display screen; and a storage section that stores information display screen setting data including default conditions for preparing the information display screen, the method (i) changing, in accordance with an instruction received from the server, at least one of the default conditions included in the information display screen setting data, and (ii) causing the display section to display an information display screen prepared on a basis of the information display screen setting data including the change. The above arrangement thereby makes it possible to (i) change, in accordance with an instruction by an application operating on the server connected to the multifunction peripheral over a communications network, an information display screen prepared by the information display screen preparation section, which operates on the multifunction peripheral, and consequently (ii) display the information display screen in a display style according to the application.

The method may be arranged such that the display section displays, as the information display screen, an operation input image for use by a user to input text; the storage section stores, as the information display screen setting data, default data including default conditions for preparing the operation input image; the multifunction peripheral further includes an input accepting section that accepts a text input by the user for the operation input image; the information display screen preparing step (i) changes, in accordance with setting update data included in the instruction received by the multifunction peripheral from the server, at least one of the default conditions included in the default data, and (ii) prepares operation input image data on a basis of the default data including the change; and the information display screen displaying step causes the display section to display a first operation input image corresponding to the operation input image data.

The above method allows an operation input screen for use by the user in text input to be displayed in a display style according to a display screen prepared by the application on the server.

The above multifunction peripheral may be in the form of a computer. In this case, the present invention further encompasses (i) a program for causing a computer to operate as each of the above sections to use the computer as the multifunction peripheral and (ii) a computer-readable storage medium that stores the program.

INDUSTRIAL APPLICABILITY

The present invention is applicable to (i) a multifunction peripheral control system in which a multifunction peripheral and a server communicably connected to each other over a communications network operate in association with each other, (ii) a multifunction peripheral control method, and (iii) a multifunction peripheral included in the multifunction peripheral control system.

REFERENCE SIGNS LIST 1 multifunction peripheral control system
10 multifunction peripheral
11 control section (information display screen preparation section; image preparing section)
12 operation section
12a input section (input accepting section)
12b display section
13 image reading section (image data obtaining section)
14 image forming section
15 storage section
16 second communication section (image data obtaining section)
21 device control section (information display screen preparation section; image preparing section)
21a open I/F section
22 web browser section
23 control application section
24 second web server section
30 communications network
50 server
51 control section
52 first communication section
53 first web server section
54 external application section

The invention claimed is:

1. A multifunction peripheral that is communicably connected over a communications network to a server which executes an application program and that executes a process according to an instruction by the application program, the multifunction peripheral comprising:
a display section that displays an information display screen;
a storage section that stores information display screen setting data including default conditions for preparing said information display screen; and
an information display screen preparation section that prepares said information display screen on a basis of the information display screen setting data,
the information display screen preparation section (i) changing, in accordance with an instruction received from the server, at least one of the default conditions included in the information display screen setting data, and (ii) preparing said information display screen on a basis of the information display screen setting data including the change,
wherein:
the display section displays, as said information display screen, an operation input image for use by a user to input text;
the storage section stores, as the information display screen setting data, default data including default conditions for preparing said operation input image;
the information display screen preparation section prepares said operation input image on a basis of the default data;

the multifunction peripheral further comprises an input accepting section that accepts a text input by the user for said operation input image;

the information display screen preparation section (i) changes, in accordance with setting update data included in an instruction received from the server, at least one of the default conditions included in the default data, and (ii) causes the display section to display, as said information display screen, said operation input image prepared on a basis of the default data including the change;

the default conditions included in the default data include information indicative of a plurality of parts images to be displayed in said operation input image; and the setting update data is information for changing the default conditions, included in the default data, so that at least one of the plurality of parts images is displayed in said operation input image and that a rest of the plurality of parts images is not displayed in said operation input image.

2. The multifunction peripheral according to claim 1, further comprising:

an image forming section that executes an image forming process for forming, on a recording material, an image corresponding to second image data, wherein:

said information display screen is a preview screen for, before the image forming process is executed, presenting a user with the image corresponding to the second image data; and the information display screen preparation section causes the display section to display, as the preview screen, said information display screen prepared by combining (i) first image data corresponding to the information display screen setting data including the change with (ii) the second image data.

3. A multifunction peripheral control system comprising:

a server that executes an application program; and a multifunction peripheral that is communicably connected to the server over a communications network and that executes a process according to an instruction by the application program, the multifunction peripheral including:

a display section that displays an information display screen which allows a user to input an instruction to the application program;

a storage section that stores information display screen setting data including default conditions for preparing said information display screen; and an information display screen preparation section that prepares said information display screen on a basis of the information display screen setting data, the server transmitting an instruction to the multifunction peripheral in order to change at least one of the default conditions included in the information display screen setting data, the information display screen preparation section, when causing the display section to display said information display screen, (i) changing, in accordance with the instruction transmitted from the server, at least one of the default conditions included in the information display screen setting data, and (ii) causing the display section to display said information display screen prepared on a basis of the information display screen setting data including the change, wherein:

the display section displays, as said information display screen, an operation input image for use by a user to input text;

the storage section stores, as the information display screen setting data, default data including default conditions for preparing said operation input image;

the information display screen preparation section prepares said operation input image on a basis of the default data;

the multifunction peripheral further comprises an input accepting section that accepts a text input by the user for said operation input image;

the information display screen preparation section (i) changes, in accordance with setting update data included in an instruction received from the server, at least one of the default conditions included in the default data, and (ii) causes the display section to display, as said information display screen, said operation input image prepared on a basis of the default data including the change;

the default conditions included in the default data include information indicative of a plurality of parts images to be displayed in said operation input image; and the setting update data is information for changing the default conditions, included in the default data, so that at least one of the plurality of parts images is displayed in said operation input image and that a rest of the plurality of parts images is not displayed in said operation input image.

4. A method for controlling a multifunction peripheral that is communicably connected over a communications network to a server which executes an application program and that executes a process according to an instruction by the application program, the multifunction peripheral including:

a display section that displays an information display screen; and a storage section that stores information display screen setting data including default conditions for preparing said information display screen, the method comprising:

an information display screen preparing step for (i) changing, in accordance with an instruction received from the server, at least one of the default conditions included in the information display screen setting data, and (ii) preparing said information display screen on a basis of the information display screen setting data including the change; and an information display screen displaying step for causing the display section to display said information display screen, wherein:

the display section displays, as said information display screen, an operation input image for use by a user to input text;

the storage section stores, as the information display screen setting data, default data including default conditions for preparing said operation input image;

the information display screen preparing step includes preparing said operation input image on a basis of the default data;

the method further comprises an input accepting step for accepting a text input by the user for said operation input image;

the information display screen preparing step for (i) changing, in accordance with setting update data included in an instruction received from the server, at least one of the default conditions included in the default data: and for
(ii) causing the display section to display, as said information display screen, said operation input image prepared on a basis of the default data including the change;
the default conditions included in the default data include information indicative of a plurality of parts images to be displayed in said operation input image; and
the setting update data is information for changing the default conditions, included in the default data, so that at least one of the plurality of parts images is displayed in said operation input image and that a rest of the plurality of parts images is not displayed in said operation input image.

5. A non-transitory computer-readable storage medium that stores a program for operating the multifunction peripheral according to claim 1, the program causing a computer to function as the information display screen preparation section.

* * * * *